United States Patent
Bales et al.

(10) Patent No.: US 9,220,033 B1
(45) Date of Patent: Dec. 22, 2015

(54) DYNAMICALLY TRANSMITTING PILOT SIGNALS FROM A BASE STATION

(71) Applicant: Sprint Communications Company L.P., Overland Park, KS (US)

(72) Inventors: Stephen R. Bales, Lee's Summit, MO (US); Maneesh Gauba, Overland Park, KS (US); Paul Jacob Sterchi, Lawrenceburg, IN (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 194 days.

(21) Appl. No.: 14/096,356

(22) Filed: Dec. 4, 2013

(51) Int. Cl.
*H04W 28/02* (2009.01)
(52) U.S. Cl.
CPC .................................. *H04W 28/0284* (2013.01)
(58) Field of Classification Search
None
See application file for complete search history.

(56) References Cited

U.S. PATENT DOCUMENTS

| 2006/0280113 | A1* | 12/2006 | Huo | 370/208 |
| 2008/0013500 | A1* | 1/2008 | Laroia et al. | 370/338 |
| 2008/0037410 | A1* | 2/2008 | Egashira et al. | 370/206 |
| 2011/0034175 | A1 | 2/2011 | Fong et al. | |

* cited by examiner

*Primary Examiner* — Ian N Moore
*Assistant Examiner* — Eric H Wang

(57) ABSTRACT

Examples disclosed herein provide systems, methods, and software for operating a wireless base station with dynamic pilot signals. In one example, a method of operating a wireless base station includes transmitting a first pilot signal at a first pilot frequency centered in a frequency band, wirelessly receiving first user data using a first filter configuration to pass energy within the frequency band, and detecting a network condition. The method further includes, in response to detecting the network condition, terminating transmission of the first pilot signal, and transmitting second and third pilot signals at second and third frequencies. The method also includes wirelessly receiving second user data using a second filter configuration, and wirelessly receiving third user data using a third filter configuration.

20 Claims, 6 Drawing Sheets

DYNAMICALLY TRANSMITTING PILOT SIGNALS FROM A BASE STATION

TECHNICAL BACKGROUND

Wireless communication devices typically join wireless base stations based on their movement. The wireless base stations account for the movement of the devices and schedule the devices to send and receive data over the network. In some examples, such as in rural or sparsely populated areas, scheduling of communications may be easy and the bandwidth broad allowing users to freely communicate wireless data. In other examples, the base stations may be located in a densely populated area, which may cause strain on the base station to schedule each of the users' requests.

To accommodate the users on the network, wireless base stations may divide the networks into carriers, which provide different channels for device communication. These channels allow for multiple devices to communicate with a base station at the same time without interfering with other devices' communications. However, as more and more devices attempt to join the network, even the multiplexed channels can become inundated and overloaded. As a result, the data connections with the devices may become slow or non-existent due to the load and stress on the system.

OVERVIEW

Examples disclosed herein provide systems, methods, and software for operating a wireless base station with dynamic pilot signals. In one example, a method of operating a wireless base station includes transmitting a first pilot signal at a first pilot frequency centered in a frequency band, wirelessly receiving first user data using a first filter configuration to pass energy within the frequency band, and detecting a network condition. The method further includes, in response to detecting the network condition, terminating transmission of the first pilot signal, and transmitting a second pilot signal at a second frequency and a third pilot signal at a third frequency. The method also includes wirelessly receiving second user data using a second filter configuration, and wirelessly receiving third user data using a third filter configuration.

In another instance, a wireless base station includes a communication interface module configured to transmit a first pilot signal at a first pilot frequency centered in a frequency band, wirelessly receive first user data using a first filter configuration to pass energy within the frequency band. The communication interface module is also configured to, in response to detecting a network condition, terminate transmission of the first pilot signal, and transmit a second pilot signal at a second frequency and a third pilot signal at a third frequency. Further, the communication interface is configured to receive second and third user data using a second and third filter configuration. The wireless base station also includes a processing system configured to identify the network condition based on the load of the wireless base station.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Long Term Evolution, or LTE, is a standard for wireless communication of high-speed data for various mobile devices. These mobile devices may include smart telephones, tablet computers, laptop computers, amongst other types of mobile devices. To handle the traffic generated by the devices, base stations that provide the LTE signal may allocate frequency and time for the mobile devices within the carrier bandwidth. These frequencies are typically assigned using carriers and subcarriers to give different devices different portions of the frequency spectrum.

In operation, when a device would like to upload data using an LTE communication network, the device will first search for carriers and subcarriers that are available for the network. If the network is available, the device will join the network and begin communicating data signals with the base station accordingly. However, as more devices attempt to join the network, the network may become slow or unavailable. As a result, the wireless device may be unable to make the requested communication.

Figure 1:
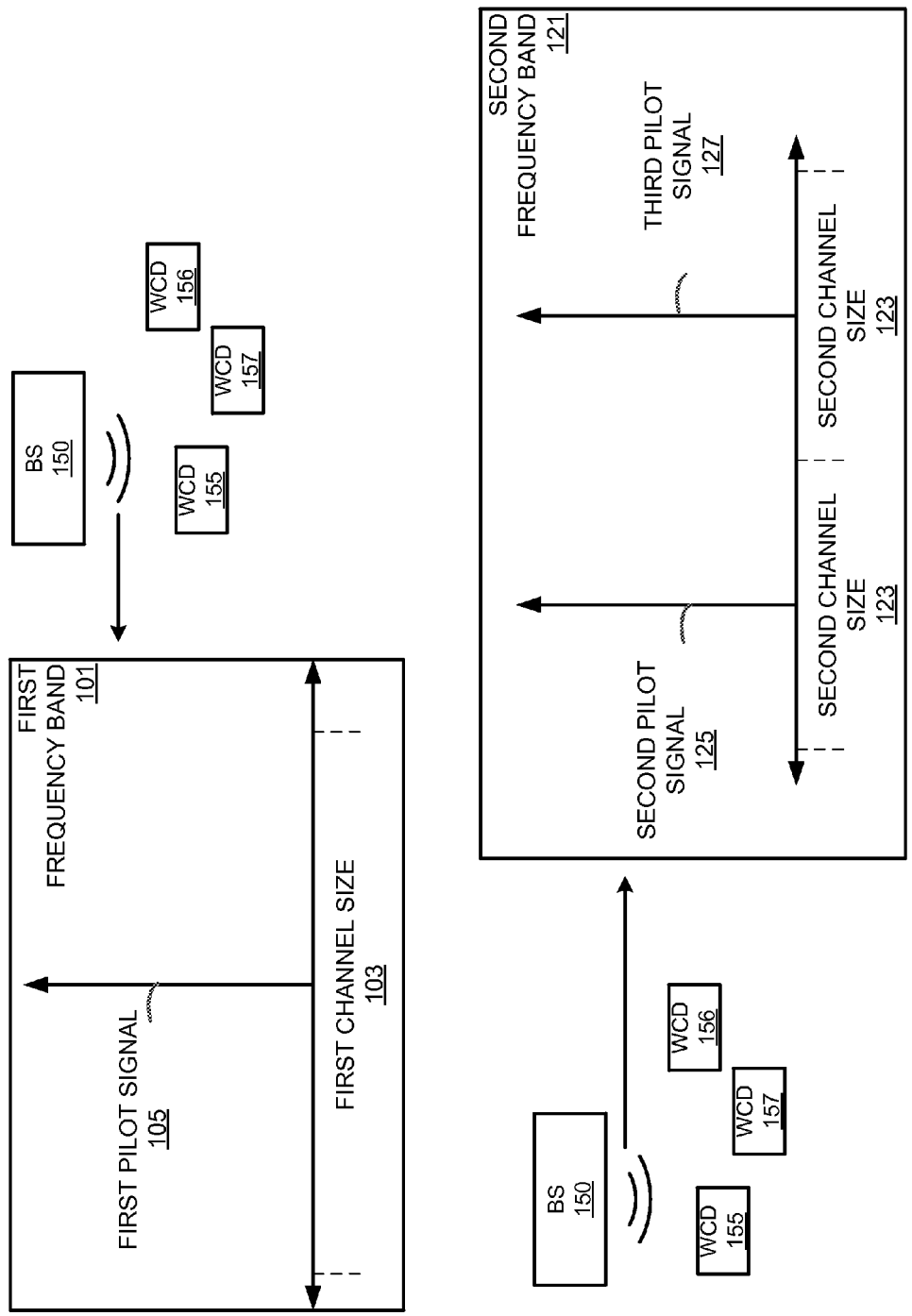
FIG. 1 illustrates dynamically adjusting the pilot frequencies in an LTE band based on a network condition.

Referring now to FIG. 1, FIG. 1 illustrates dynamically adjusting the pilot frequencies in an LTE band based on a network condition. FIG. 1 includes base station 150 and wireless communication devices 155-157. Base station 150 is used to provide initial frequency band 101 and second frequency band 121 to wireless communication devices 155-157. First frequency band 101 includes first channel size 103 (the full frequency band) and first pilot signal 105. Second frequency band 121 includes second channel size 123, second pilot signal 125, and third pilot signal 127. In operation, base station 150 will provide an LTE band to users to allow them to upload and download using the LTE communication network. This band may be divided using pilot frequencies, which are used to divide the channels for the wireless communication.

In initial frequency band 101, first pilot signal 105 with first channel size 103 is presented. This may be a situation when the network is not busy providing user communications. However, as more devices attempt to join the network, there may be a need for an increase in the channels that are available to serve the devices. This change may come as a result of an increased number of users on the network, information regarding hybrid automatic repeat requests (HARQ) from a user device, system load based on the amount of data requested from the system, or a signal to noise ratio for the system, among other possible network characteristics.

Upon the determination that the network has too great of load to be handled with first channel size 103, wireless base station 150, which may comprise an eNodeB in some examples, will add two additional pilot signals to form second frequency band 121. Second frequency band 121 adds second pilot signal 125 and third pilot signal 127, while terminating the transmission of first pilot signal 105. By adding these additional pilot signals, bandwidth may be reduced for each of the users that attempt to use the wireless communication network, however, more users may be able to access the network.

Figure 2:
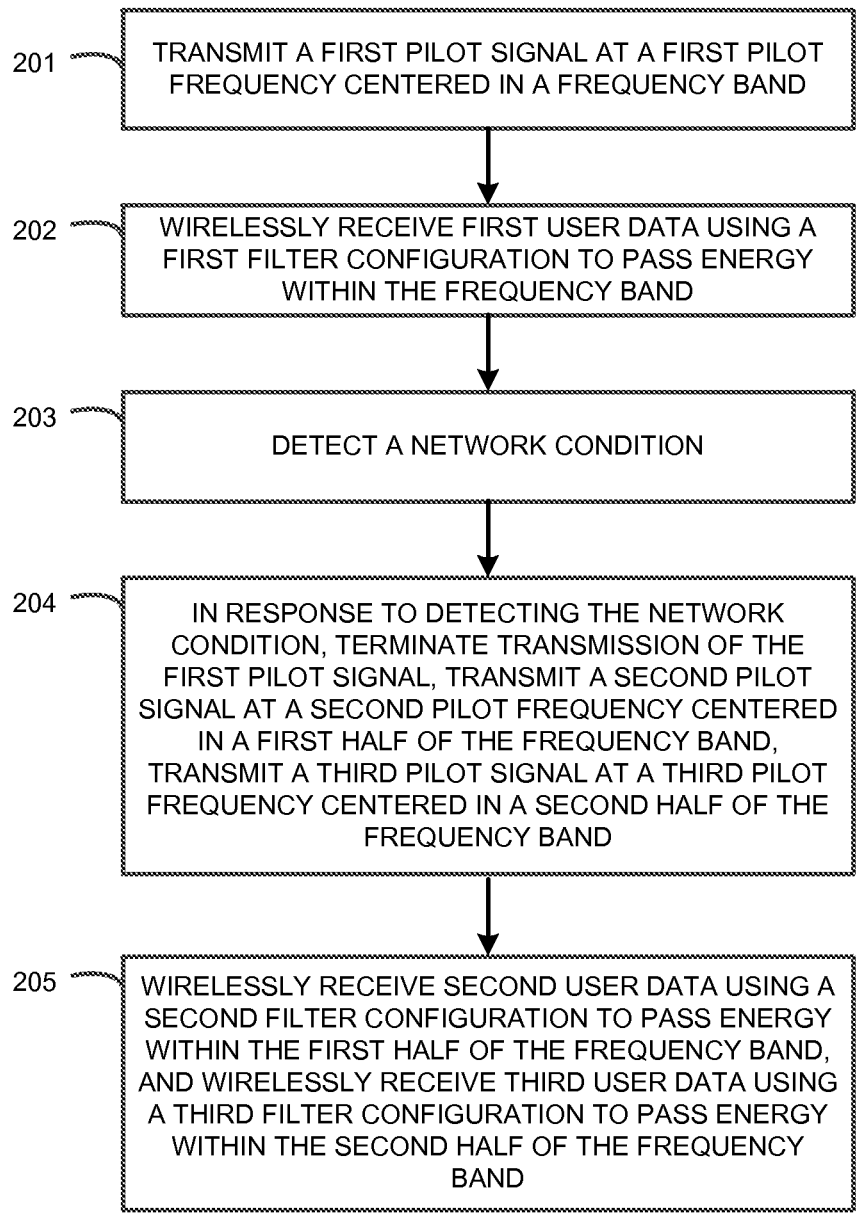
FIG. 2 illustrates a method of operating a wireless base station to provision additional pilot signals.

Turning to FIG. 2, FIG. 2 illustrates a method of operating a wireless base station to provision additional pilot signals. The method includes transmitting a first pilot signal at a first pilot frequency centered in a frequency band (201). This first pilot signal may allow for communication with user communication devices with a wider bandwidth, but may prevent some users from joining the network in a congested area. As illustrated in initial frequency band 101, first pilot signal 105 is centered in the frequency band and there is an initial channel size, first channel size 103. While transmitting the first pilot signal, the base station is configured to wirelessly receive first user data using a first filter configuration to pass energy within the frequency band (202). As a result, the base station allows wireless communication devices to use the initial channel size to upload data for applications, phone calls, and the like.

While the base station is configured to receive the data from the communication devices, the base station is further configured to detect a network condition (203). A network condition may comprise a variety of elements that would indicate that the base station is suffering from an increased load, such as a number of users requiring the use of the base station, a specific signal to noise ratio, hybrid automatic repeat request (HARQ) information, among other possible network condition load identifiers. In some examples, the base station may have a threshold number of users that the base station is triggered to identify. Once the threshold is achieved, the network condition may be satisfied. In another example, a signal to noise ratio may be used to identify the network condition. As a result, once the signal to noise ratio is met, the network condition may be satisfied for the base station. In other examples, HARQ information may be received from the wireless communication devices, such as the number of times the devices had to request the base station before the data request was satisfied. If a threshold number of requests are required, then the network condition may be satisfied.

Once the network condition has been identified by the base station, the base station is configured to terminate the transmission of the first pilot signal, transmit a second pilot signal at a second pilot frequency centered in a first half of the frequency band, and transmit a third pilot frequency centered in a second half of the frequency band (204), as illustrated by second frequency band 121. By adding the additional pilot signals, the base station increases the number of channels available to the wireless communication devices. As a result, although the bandwidth may diminish, more users may be able to communicate than was previously possible with the first configuration.

The base station is then configured to receive second user data using a second filter configuration to pass energy within the first half of the frequency band, and receive third user data using a third filter configuration to pass energy within the second half of the frequency band (205). By adding the additional pilot signals, devices may communicate using the first and the second half of the frequency band. As a result, filters within the base station need to be configured to process the signals in these frequencies from the wireless devices. In some examples, when the additional pilot signals are added, the base station will temporarily remove all user communications before restarting the communications with the new pilot signals. In other examples, when the additional pilot signals are added, the preexisting communications will continue on the base station, and all new communications will operate based on the new pilot signals.

Figure 3:
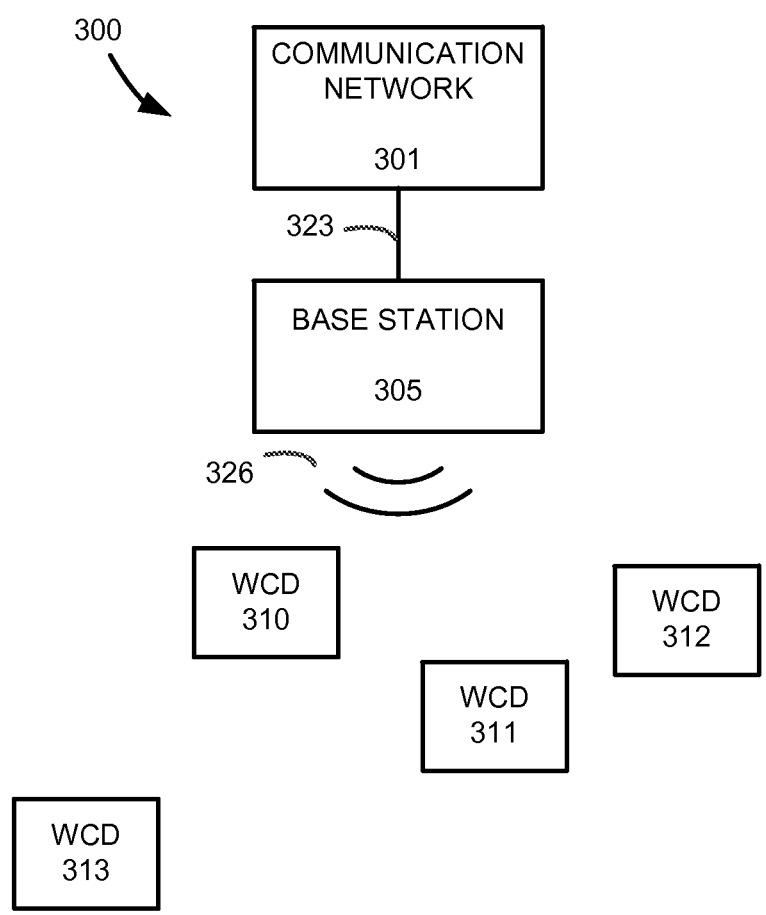
FIG. 3 illustrates a wireless communication system with the ability to add pilot frequencies.

FIG. 3 illustrates a wireless communication system 300 with the ability to add pilot frequencies. Wireless communication system 300 includes communication network 301, base station 305, and wireless communication devices (WCDs) 310-313. Communication network 301 is communicatively linked using communication link 323. WCDs 310-313 communicate with base station 305 using wireless sector 326.

In operation, base station 305, which may comprise an eNodeB in some examples, may provide wireless communication to WCDs 310-313. This communication could be used to provide data for applications on WCDs 310-313, provide voice calls to WCDs 310-313, or any other type of communication with WCDs 310-313. In some instances, base station 305 may be configured to provide the greatest amount of bandwidth to the various wireless devices that are communicating with it. Thus, base station 305 may provide a smaller amount of channels, but with a greater amount of bandwidth for the devices. However, as more devices begin to use the wireless communication network, the channels may see an increase in load that can no longer be supported with the current configuration of base station 305. As a result, based on this network load or network condition, base station 305 may provide a greater amount of pilot signals. In some examples, base station 305 may initially provide a first pilot signal at a first pilot frequency in the center of a frequency band. Once the network condition is satisfied, base station 305 may terminate the transmission of the first pilot signal, transmit a second pilot signal at a second pilot frequency centered in a first half of the frequency band, and transmit a third pilot frequency centered in a second half of the frequency band.

To recognize the increased load and the network condition, base station 305 may consider a variety of factors. These factors may include a number of users requiring the use of the base station, a specific signal to noise ratio, hybrid automatic repeat request (HARD) information, among other possible network condition load identifiers—including combinations thereof. In some examples, base station 305 may have a threshold number of users that the base station is triggered to identify. Once the threshold is achieved, the network condition may be satisfied and the base station may modify settings accordingly. In another example, a signal to noise ratio may be used to identify the network condition. As a result, once the signal to noise ratio is met, the network condition may be satisfied for the base station. In still other examples, HARQ information may be received from the wireless communication devices, such as the number of times the device had to request the base station before the request was satisfied. If a threshold number of requests are required to access base station 305, then the network condition may be satisfied.

Communication network 301 comprises network elements that provide communications services to WCDs 310-313 through base station 305. Communication network 301 may comprise switches, wireless access nodes, Internet routers, network gateways, application servers, computer systems, communication links, or some other type of communication equipment—including combinations thereof.

Base station 305 comprises Radio Frequency (RF) communication circuitry and an antenna. The RF communication circuitry typically includes an amplifier, filter, RF modulator, and signal processing circuitry. Base station 305 may also comprise a router, server, memory device, software, processing circuitry, cabling, power supply, network communication interface, structural support, or some other communication apparatus. Base station 305 may be an eNodeB in some examples configured to communicate with WCDs 310-313 using LTE communication format.

WCDs 310-313 each comprise RF communication circuitry and an antenna. The RF communication circuitry typically includes an amplifier, filter, modulator, and signal processing circuitry. WCDs 310-313 may also include a user interface, memory device, software, processing circuitry, or some other communication components. WCDs 310-313 may be a telephone, computer, e-book, mobile Internet appliance, wireless network interface card, media player, game console, or some other wireless communication apparatus—including combinations thereof.

Wireless sector 326 includes wireless links that use the air or space as a transport media. In the present example, wireless sector 326 is configured to communicate between base station 305 and WCDs 310-313 using LTE communication format. Communication link 323 uses metal, glass, air, space, or some other material as the transport media. Communication link 323 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), LTE, Wireless Fidelity (WIFI), High Speed Packet Access (HSPA), or some other communication format—including combinations thereof. Communication links 323 could be a direct link or may include intermediate networks, systems, or devices.

Figure 4:
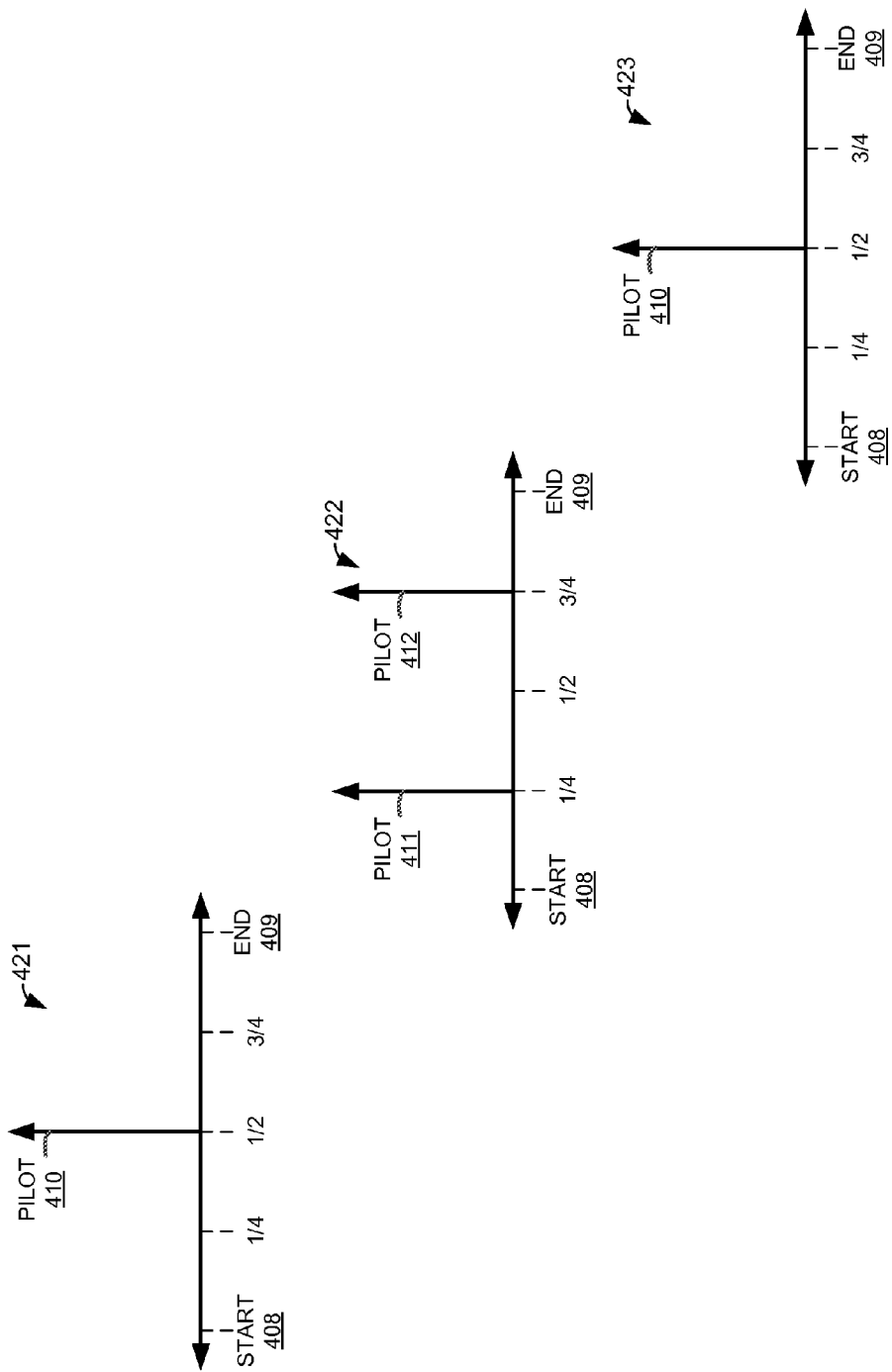
FIG. 4 illustrates an overview of adjusting pilot frequencies in an LTE band based on network conditions.

Referring now to FIG. 4, FIG. 4 illustrates an overview of adjusting pilot frequencies in an LTE band based on network conditions. FIG. 4 includes frequency bands 421-423 that reside between start 408 and end 409, and pilot signals 410-412. In operation, a base station may provide wireless communications to a variety of wireless communication devices. As illustrated in frequency band 421, the base station may initially provide a first pilot signal 410 at a first pilot frequency that resides in the middle of frequency band 421. As more wireless devices start to use the wireless communication network, the more the base station may become loaded with data requests. Thus, users may experience delay in the data requests or an inability to join the network.

To compensate for this issue, the base station may dynamically implement frequency band 422. As illustrated in frequency band 422, the base station adds two additional pilot signals 411-412 and removes pilot signal 410. These added pilot signals reside in the middle of the first half of the frequency band and the middle of the second half of the frequency band. By adding these additional pilot signals, the base station is able to create more channels for the wireless devices to join. Thus, although each channel may take less bandwidth, the base station may service more devices.

Once the load has diminished for the base station, a network condition could then be determined to return the base station to the initial state. As illustrated with frequency band 423, pilot signal 410 has been added and pilot signals 411-412 have been removed from the band upon the detection of the network condition. Thus, the frequency band now only includes pilot signal 410 for the various wireless communication devices.

In some examples, upon the detection of a network condition and changing the pilot signals, the base station will briefly drop communication with currently connected wireless devices. Thus, when the devices return they will identify the new pilot signals.

Figure 5:
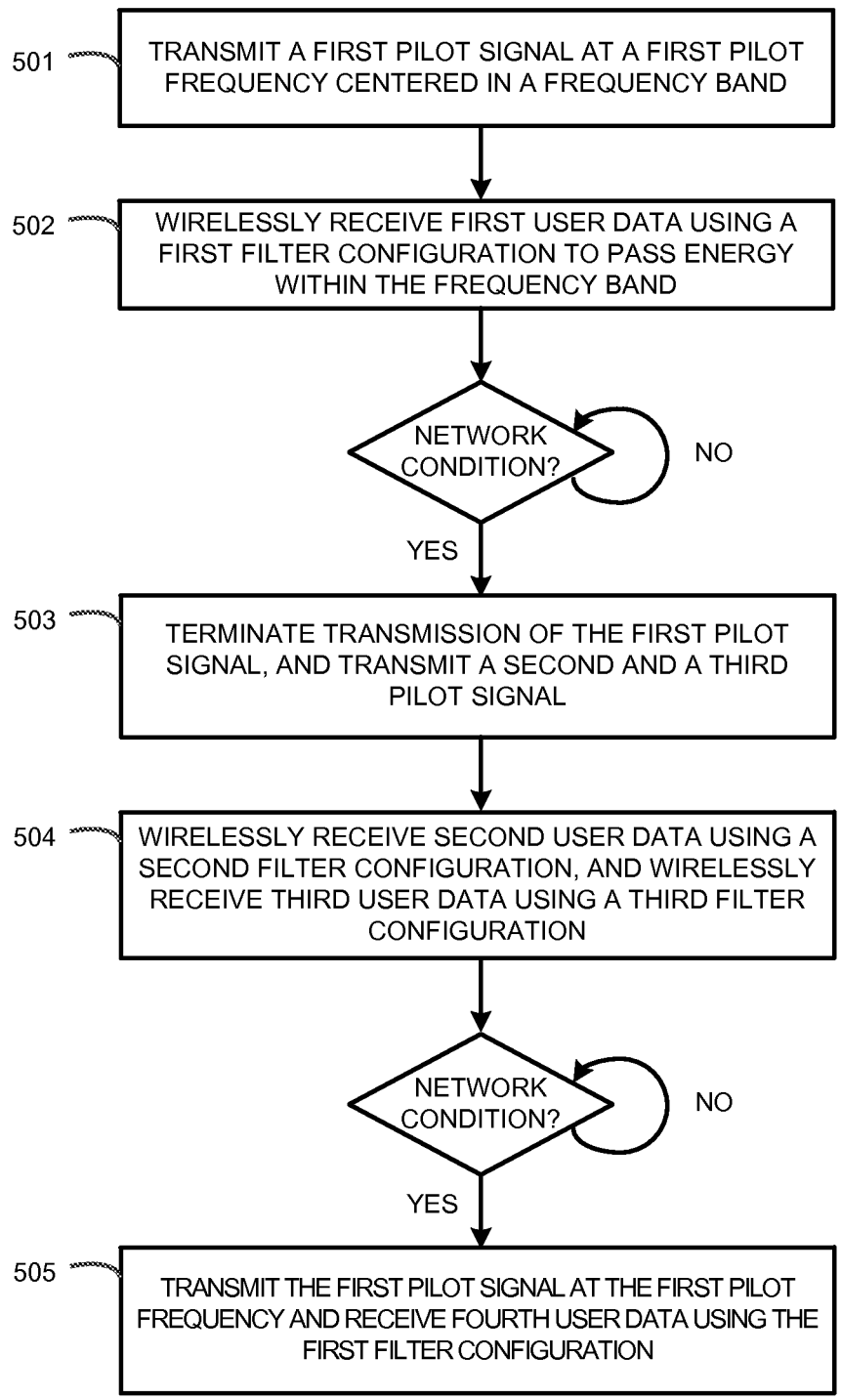
FIG. 5 illustrates a flow diagram for adjusting pilot frequencies in an LTE band based on network conditions.

FIG. 5 illustrates a flow diagram for operating a base station to adjust pilot frequencies in an LTE band based on network conditions. The flow diagram initiates by transmitting a first pilot signal at a first pilot frequency centered in a frequency band (501). This pilot signal may be used in situation where the base station is not inundated with devices, and attempts to provide a greater amount of bandwidth to the various connected user equipment. The base station is further configured to wirelessly receive first user data using a first filter configuration to pass energy within the frequency band (502). Thus, when the connected wireless devices transmit to the base station based on the pilot signal, the base station is able to receive the signals using a first filter configuration.

During the receipt of the first user data, the base station is also configured to detect a network condition. A network condition may include a number of users requiring the use of the base station, a specific signal to noise ratio, hybrid automatic repeat request (HARQ) information, among other possible network condition load identifiers—including combinations thereof. In some examples, the base station may have a threshold number of users that the base station is triggered to identify. Once the threshold is achieved, the network condition may be satisfied and the base station may modify settings accordingly. In another example, a signal to noise ratio may be used to identify the network condition. As a result, once the signal to noise ratio is met, the network condition may be satisfied for the base station. In still other examples, HARQ information may be received from the wireless communication devices, such as the number of times the device had to request the base station before the request was satisfied. If a threshold number of requests are required to access the base station, then the network condition may be satisfied.

In response to detecting the network condition, the base station is then configured to terminate the transmission of the first pilot signal, transmit a second pilot frequency centered in a first half of the frequency band, and transmit a third pilot signal at a third pilot frequency centered in a second half of the frequency band (503). Based on these new pilot signals, the base station will also wirelessly receive second user data using a second filter configuration for the first half of the frequency band, and wirelessly receive third user data using a third filter configuration for the second half of the frequency band (504). Referring back to FIG. 4, the first half of the frequency band would be between start 408 and one-half of the frequency band, and the second half of the frequency band would be between the one-half and end 409 of the frequency band. By adding these additional pilot signals, the base station is more capable of providing a greater number of devices data communications. Rather than providing the greatest bandwidth to each of the devices, the increase in pilot signals allows a greater number of channels to be available to accommodate the increased load on the base station.

While transmitting the additional pilot signals and receiving the second and third user data, the base station is also configured to determine if a second network condition is satisfied. Such a network condition may include a number of users using the base station, a signal to noise ratio for the base station, HARQ information from the wireless communication devices attempting to connect to the base station, among other possible network conditions. In some examples, the base station may identify when the number of users connected drops below a certain threshold to satisfy the network condition. In other instances, the base station is configured to determine when the signal to noise ratio drops below a certain threshold and identifies this as a satisfied network condition. In still other examples, the base station may identify HARQ information from wireless devices that are connected to the base station. Based on the number of times that the devices need to request the base station to satisfy the data request, this information could be used for the second network condition.

Following the satisfaction of the network condition, the base station is then configured to transmit the first pilot signal at the first pilot frequency and receive fourth user data using the first filter configuration (505). Thus, based on the second network condition, the base station is configured to return to the original state, and remove the additional pilot frequencies. As a result, in some examples, the additional pilot frequencies that are added in the frequency band are only used when there is a heavy load on the wireless system, and are removed when they are no longer necessary to satisfy the requests of the wireless communication devices.

Figure 6:
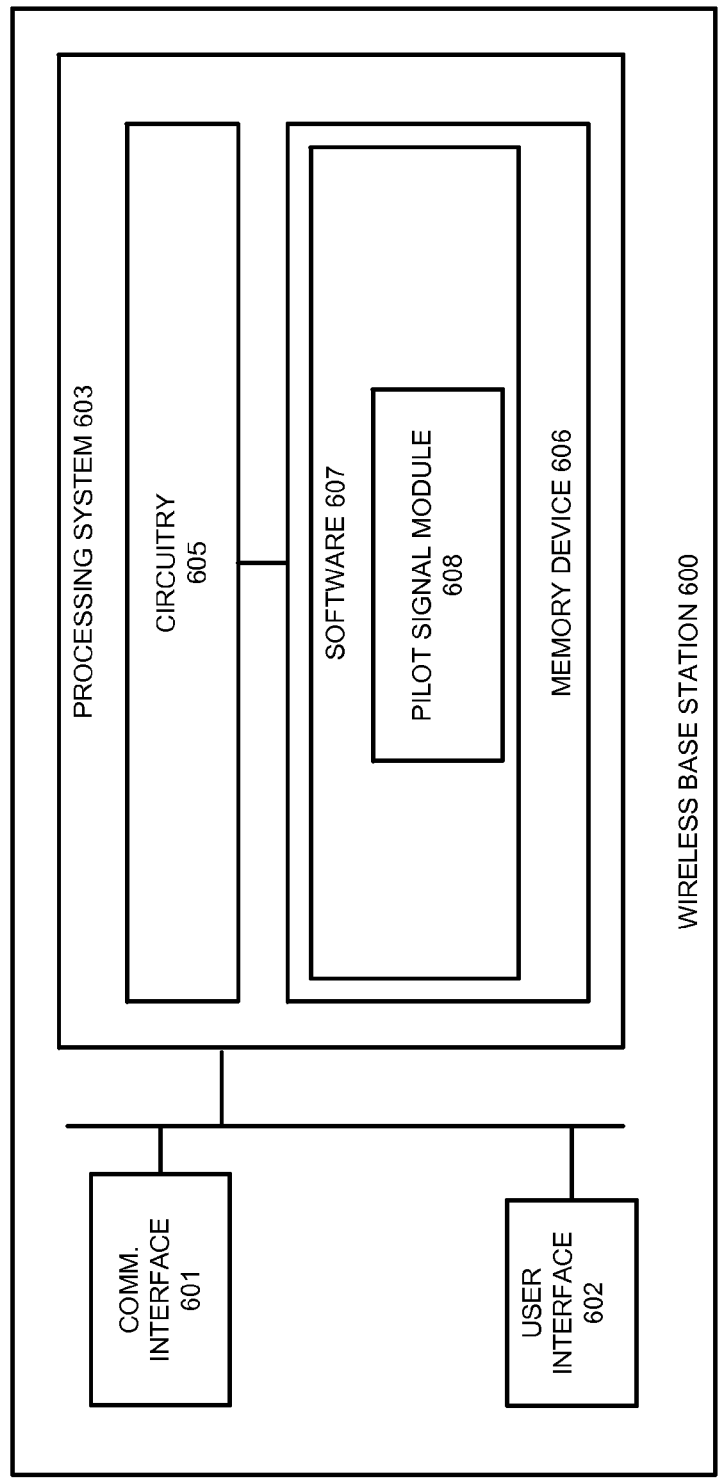
FIG. 6 illustrates a wireless base station with the ability to adjust pilot frequencies in an LTE band based on network conditions.

FIG. 6 illustrates a wireless base station 600 with the ability to dynamically adjust pilot signals. Wireless base station 600 is an example of base stations 150 and 305, although other examples may exist. Wireless base station 600 includes communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. Communication interface 601 is configured to communicate with wireless communication devices using LTE communication format, but may further be configured to communicate with other devices using any of the aforementioned formats. Some external devices may include servers, gateways, or any other device necessary for communication with the wireless communication devices.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes pilot signal module 608. Operating software 607 may include an operating system, utilities, drivers, network interfaces, applications, or some other type of software. When executed by circuitry 605, operating software 607 and pilot signal module 608 direct processing system 603 to operate wireless base station 600 as described herein.

In particular, pilot signal module 608 may direct wireless base station 600 to transmit, using communication interface 601, a first pilot signal at a first pilot frequency that is centered in a frequency band. This may be the default setting for wireless base station 600 to provide the greatest amount of bandwidth to the connected wireless communication devices. Pilot signal module 608 may further direct wireless base station 600 to wirelessly receive first user data using a first filter configuration to pass energy within the frequency band. Thus, communication interface 601 may be configured to filter data signals from connected wireless devices using a filter for the entire frequency band.

While base station 600 is receiving data from the wireless communication devices, pilot signal module 608 further directs base station 600 to determine if a network condition is satisfied. A network condition may be satisfied when there are enough users attempting to use base station 600, when there is enough of a signal to noise ratio on base station 600, when HARQ information submitted by wireless devices indicates that it takes a threshold number of attempts to access the network, or any other network condition that may signify a larger load on base station 600.

Following the identification of a network condition, pilot signal module 608 configures communication interface 601 to terminate the transmission of the first pilot signal, transmit a second pilot signal at a second pilot frequency centered in a first half of the frequency band, and transmit a third pilot signal at a third pilot frequency centered in a second half of the frequency band. Pilot signal module 608 is also configured to enable communication interface 601 to wirelessly receive second user data using a second filter configuration to pass energy within the first half of the frequency band, and wirelessly receive third user data using a third filter configuration to pass energy within the second half of the frequency band. By adding these pilot signals, base station is 600 is able provide a greater number of channels for devices that may attempt to connect.

Further, in some examples, pilot signal module 608 may be configured to monitor for a second network condition that would represent when the load at base station 600 has diminished. This second network condition may set a second threshold based on the number of users, based on the signal to noise ratio, based on HARQ information from wireless devices, or any other information that may indicate a decrease in load on base station 600. Once the threshold has been reached, wireless base station 600 may revert back to the original state with the first pilot signal and may cease transmitting the second and third pilot signals.

Although illustrated with one software module in the present example, it should be understood that wireless base station 600 may include any number of software modules to dynamically add pilot signals within a frequency band.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless base station comprising:
    transmitting a first pilot signal at a first pilot frequency centered in a frequency band;
    wirelessly receiving first user data using a first filter configuration to pass energy within the frequency band;
    detecting a network condition;
    in response to detecting the network condition, terminating the transmission of the first pilot signal, transmitting a second pilot signal at a second pilot frequency centered in a first half of the frequency band, transmitting a third pilot signal at a third pilot frequency centered in a second half of the frequency band;

wirelessly receiving second user data using a second filter configuration to pass second energy within the first half of the frequency band; and wirelessly receiving third user data using a third filter configuration to pass third energy within the second half of the frequency band.

2. The method of claim 1 wherein the wireless base station comprises an eNodeB.

3. The method of claim 1 wherein the network condition comprises a condition based on a number of wireless communication devices communicating with the wireless base station.

4. The method of claim 1 wherein the network condition comprises a condition based on hybrid automatic repeat request (HARQ) information from one or more wireless communication devices communicating with the wireless base station.

5. The method of claim 1 wherein the network condition comprises a condition based on a signal to noise ratio threshold.

6. The method of claim 1 wherein the network condition comprises condition based on a threshold data load on the wireless base station.

7. The method of claim 1 further comprising:

detecting another network condition;

in response to detecting the other network condition, transmitting the first pilot signal at the first pilot frequency centered in the frequency band, terminating the transmission of the second pilot signal and the third pilot signal; and wirelessly receiving fourth user data using the first filter configuration.

8. The method of claim 7 wherein the other network condition comprises a condition based on a number of wireless communication devices communicating with the wireless base station.

9. The method of claim 7 wherein the other network condition comprises a condition based on hybrid automatic repeat request (HARQ) information from one or more wireless communication devices communicating with the wireless base station.

10. The method of claim 7 wherein the other network condition comprises a condition based on a signal to noise ratio threshold.

11. A wireless base station for Long Term Evolution (LTE) communication comprising:

a communication interface module configured to:

transmit a first pilot signal at a first pilot frequency centered in a frequency band;

wirelessly receive first user data using a first filter configuration to pass energy within the frequency band;

in response to receiving re-configuration data, terminate the transmission of the first pilot signal, transmit a second pilot signal at a second pilot frequency centered in a first half of the frequency band, transmit a third pilot signal at a third pilot frequency centered in a second half of the frequency band;

wirelessly receive second user data using a second filter configuration to pass second energy within the first half of the frequency band; and wirelessly receive third user data using a third filter configuration to pass third energy within the second half of the frequency band; and a processing system configured to:

identify a network condition and responsively transfer the re-configuration data for delivery to the communication interface module.

12. The wireless base station of claim 11 wherein the wireless base station comprises an eNodeB.

13. The wireless base station of claim 11 wherein the network condition comprises a condition based on a number of wireless communication devices communicating with the wireless base station.

14. The wireless base station of claim 11 wherein the network condition comprises a condition based at least on hybrid automatic repeat request (HARQ) information from one or more wireless communication devices communicating with the wireless base station.

15. The wireless base station of claim 11 wherein the network condition comprises a signal to noise ratio threshold.

16. The wireless base station of claim 11 wherein the network condition comprises a threshold data load on the wireless base station.

17. The wireless base station of claim 11 wherein the processing system is further configured to identify another network condition and responsively transfer second re-configuration data for delivery to the communication interface module.

18. The wireless base station of claim 17 wherein the communication interface module is further configured to:

in response to receiving the second re-configuration data, transmit the first pilot signal at the first pilot frequency centered in the frequency band, terminate the transmission of the second pilot signal and the third pilot signal; and wirelessly receive fourth user data using the first filter configuration.

19. The wireless base station of claim 18 wherein the other network condition comprises a condition based on a number of wireless communication devices communicating with the wireless base station.

20. The wireless base station of claim 18 wherein the other network condition comprises a condition based on hybrid automatic repeat request (HARQ) information from one or more wireless communication devices.

* * * * *